US010209759B2

(12) United States Patent
Gelonese et al.

(10) Patent No.: US 10,209,759 B2
(45) Date of Patent: Feb. 19, 2019

(54) STANDBY POWER CONTROLLER WITH EXTERNAL INFORMATION CAPABILITY

(71) Applicant: Embertec Pty Ltd, Dulwich, South Australia (AU)

(72) Inventors: Domenico Gelonese, Dulwich (AU); John Haskey, Dulwich (AU)

(73) Assignee: EMBERTEC PTY LTD (AU)

( * ) Notice: Subject to any disclaimer, the term of this patent is extended or adjusted under 35 U.S.C. 154(b) by 20 days.

(21) Appl. No.: 14/833,503

(22) Filed: Aug. 24, 2015

(65) Prior Publication Data

US 2016/0062440 A1 Mar. 3, 2016

(30) Foreign Application Priority Data

Aug. 26, 2014 (AU) ................................ 2014903359
Jan. 30, 2015 (AU) ................................ 2015900275

(51) Int. Cl.
*G06F 1/26* (2006.01)
*H04L 12/64* (2006.01)

(52) U.S. Cl.
CPC ............ *G06F 1/3209* (2013.01); *G06F 1/266* (2013.01); *G06F 1/325* (2013.01); *G06F 1/3234* (2013.01); *H04L 12/6418* (2013.01)

(58) Field of Classification Search
None
See application file for complete search history.

(56) References Cited

U.S. PATENT DOCUMENTS

| 4,901,007 | A | | 2/1990 | Sworm | |
|---|---|---|---|---|---|
| 5,721,934 | A | | 2/1998 | Scheurich | |
| 5,832,283 | A | * | 11/1998 | Chou | G06F 1/3203 |
| | | | | | 713/300 |
| 6,092,209 | A | | 7/2000 | Holzhammer et al. | |
| 6,476,729 | B1 | | 11/2002 | Liu | |
| 6,560,713 | B1 | * | 5/2003 | Chary | G06F 1/263 |
| | | | | | 713/320 |
| 7,380,142 | B2 | | 5/2008 | Lee et al. | |

(Continued)

FOREIGN PATENT DOCUMENTS

| AU | 2011 101402 A4 | 12/2011 |
|---|---|---|
| AU | 2012 100197 A4 | 3/2012 |

(Continued)

*Primary Examiner* — Paul Yen
(74) *Attorney, Agent, or Firm* — Craig A. Fieschko, Esq.; DeWitt Ross & Stevens S.C.

(57) ABSTRACT

An energy saving device monitors computer activity to determine if the computer is in active use, and if not in active use, it commands the computer to power down to a low energy use power state (and cut power to computer peripherals) unless a user indicates otherwise. The device also communicates the computer's energy usage (as well as energy usage of peripherals) to a remote management center associated with the electricity supply network supplying the computer. When electricity usage needs to be reduced in the electricity supply network, the remote management center sends a demand response event request to the computer, with the request commanding the computer to enter a low energy power use state unless its user indicates otherwise. If the user signifies that the low energy power use state should not be entered, the computer instead enters an intermediate reduced energy use power use state.

15 Claims, 10 Drawing Sheets

(56) References Cited

U.S. PATENT DOCUMENTS

| | | |
|---|---|---|
| 8,190,940 B2 | 5/2012 | Gelonese |
| 8,362,918 B2 | 1/2013 | Park et al. |
| 8,386,369 B2 | 2/2013 | Warnick |
| D700,579 S | 3/2014 | Mobbs |
| 2005/0030680 A1 | 2/2005 | Lee et al. |
| 2005/0289378 A1 | 12/2005 | Vorenkamp et al. |
| 2006/0053315 A1* | 3/2006 | Menzl ................. G06F 1/3203 713/300 |
| 2006/0101294 A1 | 5/2006 | Lee et al. |
| 2006/0224985 A1* | 10/2006 | Baek .................. G06F 3/0481 715/764 |
| 2008/0106148 A1 | 5/2008 | Gelonese |
| 2009/0191922 A1* | 7/2009 | Rokusek ............ H04M 1/6075 455/569.2 |
| 2009/0235107 A1 | 9/2009 | Gelonese |
| 2010/0095146 A1 | 4/2010 | Gelonese |
| 2010/0156666 A1 | 6/2010 | Choi et al. |
| 2011/0106687 A1 | 5/2011 | Warnick |
| 2011/0211851 A1* | 9/2011 | Imine .................. G06F 1/3209 399/37 |
| 2011/0254371 A1 | 10/2011 | Galsim et al. |
| 2012/0080949 A1 | 4/2012 | Gelonese |
| 2012/0312989 A1 | 12/2012 | Gelonese |
| 2013/0043730 A1* | 2/2013 | Claise ................. G06F 1/263 307/66 |
| 2013/0060397 A1* | 3/2013 | Hawkins ............ G06Q 10/0631 700/296 |
| 2013/0116846 A1* | 5/2013 | Galsim ................. G06F 1/266 700/295 |
| 2014/0292289 A1 | 10/2014 | Gelonese |
| 2014/0310744 A1 | 10/2014 | Gelonese |
| 2015/0039429 A1 | 2/2015 | Gelonese |

FOREIGN PATENT DOCUMENTS

| | | |
|---|---|---|
| AU | 2012 101351 A4 | 9/2012 |
| CA | 2585966 A1 | 5/2006 |
| CA | 2743270 A1 | 5/2010 |
| CA | 2719683 A1 | 5/2011 |
| CN | 1773399 A | 5/2006 |
| CN | 102292895 A | 12/2011 |
| CN | 102356363 A | 2/2012 |
| EP | 1612910 A1 | 1/2006 |
| EP | 2356525 A2 | 8/2011 |
| JP | 2003 271812 A | 9/2003 |
| JP | 2006 139745 | 6/2006 |
| JP | 2011 010436 A | 1/2011 |
| KR | 20100075283 A | 7/2010 |
| NO | 20072468 A | 5/2007 |
| TW | 201031072 A | 8/2010 |
| WO | WO 03062973 A1 | 7/2003 |
| WO | WO 2006 052047 | 5/2006 |
| WO | WO 2008 077198 A1 | 7/2008 |
| WO | WO 2010 057343 A2 | 5/2010 |
| WO | WO 2010 074392 A1 | 7/2010 |
| WO | WO 2010 139020 A1 | 12/2010 |
| WO | WO 2012/075059 A2 | 6/2012 |
| WO | WO 2013 006916 A1 | 1/2013 |
| WO | WO 2013 056310 A1 | 4/2013 |
| WO | WO 2013 131147 A1 | 9/2013 |
| WO | WO 2014 094031 A1 | 6/2014 |

\* cited by examiner

STANDBY POWER CONTROLLER WITH EXTERNAL INFORMATION CAPABILITY

FIELD OF THE INVENTION

The present invention relates to an apparatus and method to regulate the supply of power to and to control the power modes of a device, in particular a computer, in response to external information.

BACKGROUND OF THE INVENTION

In a deregulated electricity market energy retailers undertake to supply electricity to consumers. The energy retailers then source this electricity from energy generators who generate the electricity using a variety of power plants, each having its own running costs and lead time to come onstream.

The price which the energy retailer pays the electricity generators for this electricity is affected by many factors including supply contracts and government regulation, but in general is driven by supply and demand. That is, in times of high demand, the price paid by the electricity retailer increases. Demand varies continuously by time of day and time of year. The price variation may be many orders of magnitude, with, for example, the marginal price of an additional kWh (kilowatt hour) varying from one cent to more than ten thousand dollars.

Due to commercial realities and political constraints, and technical limitations, it is not possible for the energy retailer to simply pass on the marginal cost directly to the consumer. The cost to the consumer of a kWh is generally fixed at a price significantly greater than the lowest marginal cost payable by the energy retailer, but very much less than the maximum possible marginal cost payable by the energy retailer; generally from tens to hundreds of cents per kWh. The consumer tariff may include coarse variation by time of day and time of year, with higher prices for periods expected to be peak demand periods, but there is no direct relationship between the marginal cost paid by an energy retailer at a given time and the amount being paid by the consumer using that marginal kWh.

Energy retailers, producers and distributors, in regulated or deregulated markets, may be placed in a position where demand for energy exceeds the available supply. This can lead to brownouts where the electricity supply to some areas is cut in order to maintain supplies to at least some areas. Blackouts may also be experienced should demand cause the voltage in the distribution network to drop below critical levels.

Computer devices, in particular personal computer devices, are routinely designed to enter a low power or standby mode when a user has not operated the computer for a defined period of time. We refer to this mode as a low power standby mode. The low power standby mode is a mode where the computer cuts or reduces the provision of power to superfluous areas of the computing device while the computer is not in use. Different degrees of reduction of power may be covered by the term low power standby mode, which may alternatively be called "sleep" or "hibernate". These allow a user to resume working or operating a machine from the standby mode without having to go through an extended reboot process. The difference between them is likely to be the speed with which the computer is able to return to full operating mode from the standby mode.

Entering a low power standby mode on a computer device will provide energy savings. However, users may find such entry to be inconvenient, especially when it is unexpected. Since the delay period for entering standby is typically set by the user, a user will often seek to avoid unexpected entry into standby mode by setting extended timeframes for the low power standby mode to be entered, resulting in a significant delay before the onset of the energy saving functionality.

Typically, a computer device will determine when to enter a low power standby mode based on a time period for which user input, usually in the form of keyboard or mouse use, is absent. Since a computer may be in use without such user input, this may lead to unexpected and unwanted activation of the low power standby mode. Such an occurrence is likely to prompt a user to greatly extend the time period before the low power standby is entered, meaning that the computer spends significant amounts of time unused but in a high power use mode.

In a business environment, it is not uncommon for users to disable the standby power mode, preferring the convenience of having the computer always on and ready to use without the need to provide user input (keyboard or mouse use) to stop the computer entering into the standby mode when the user does not wish this to happen.

SUMMARY OF THE INVENTION

The invention involves a system for reduction of electricity usage in an electricity supply network, the system being adapted to:

monitor an activity level of the computer in order to determine an activity mode of the computer;

upon determining that the activity mode has been other than active use mode for a time period exceeding a threshold time period, activate a user interface allowing a user to provide a user indication indicating that the computer should not be placed in a low energy use power state;

where such user indication is not provided, command the computer to enter a low energy power use state;

further including instructions which when executed cause the computer to create a data link to an external demand response controller;

receive from said demand response controller a demand response event request;

upon receipt of said demand response event request, activate the user interface allowing a user to provide a user indication indicating that the computer should not be placed in a low energy use power state;

and where such user indication is not provided, command the computer to enter a low energy power use state.

Preferably, the system is further adapted to activate the user interface following the demand response request only when the activity mode of the computer is determined to be other than active use mode.

The system may be further adapted to communicate to the demand response controller the user indication such that the demand response controller can determine that the computer will or will not be placed in a low energy power state.

The invention also involves a method for reducing load on an electricity supply network including the steps of:

supplying to a customer of the electricity supply network an energy saving device for controlling electricity usage of a personal computer, said control device including a software control module installed on the personal computer;

supply of said energy saving device including obtaining agreement from said customer to participate in a demand response program wherein said software control module may receive from a demand response controller a demand response event request;

upon receipt of said demand response event request, the software module will activate a user interface allowing a user to provide a user indication indicating that the computer should not be placed in a low energy use power state;

where such user indication is not provided, the software module will command the computer to enter a low energy power use state.

Preferably, the software module is adapted to monitor an activity level of the computer in order to determine an activity mode of the computer;

upon determining that the activity mode has been other than active use mode for a time period exceeding a threshold time period, activate a user interface allowing a user to provide a user indication indicating that the computer should not be placed in a low energy use power state;

where such user indication is not provided, command the computer to enter a low energy power use state;

the software module adapted to cause the computer to create a data link to an external demand response controller adapted to issue a demand response event request.

Preferably, the provision of the energy saving device on particular terms is conditional upon agreement by the customer to participate in the demand response program.

In a further form, the invention may be a system for reduction of electricity usage in an electricity supply network including a software control module adapted to:

monitor an activity level of the computer in order to determine an activity mode of the computer, upon determining that the activity mode has been other than active use mode for a time period exceeding a threshold time period, activate a user interface allowing a user to provide a user indication indicating that the computer should not be placed in a low energy use power state;

where such user indication is not provided, command the computer to enter a low energy power use state;

further including instructions which when executed cause the computer to create a data link to an external demand response controller;

receive from said demand response controller a demand response event request;

upon receipt of said demand response event request, activate the user interface, allowing a user to provide a user indication indicating that the computer should not be placed in a low energy use power state;

where such user indication is not provided, command the computer to enter a low energy power use state;

further including an energy saving device which includes an electrical inlet adapted to connect to a general power outlet, at least one monitored electrical outlet adapted to connect to the personal computer, at least one peripherals electrical outlet adapted to connect to, and to supply electrical power to, at least one peripheral device, a switch adapted to control electrical connection of the inlet to the peripherals electrical outlet, and thus to control supply of electric power to the at least one peripheral device, a sensor adapted to sense at least one characteristic of an electrical power flow through the monitored electrical outlet to the computing device, the energy saving device further adapted to remove power from the switched electrical outlet when the sensor detects that the computer has entered a low energy power use state.

Preferably, the switch is adapted to remove power from the monitored electrical outlet and the peripherals electrical outlet when the sensor means detects that the computer has entered a low energy power use state.

In a further form, the invention involves a method for reducing load on an electricity supply network, the network supplying electricity to a several personal computers running a software control module, the method including the steps of;

receiving information from software control modules running on several of said personal computers indicating that the computers are available to participate in a demand response event;

receiving from an energy supply utility associated with the electricity supply network a demand reduction request, being a request to reduce electricity consumption by devices supplied with electricity by the network;

issuing a demand response event request to the software control modules;

the demand response event request causing each software control module to activate a user interface allowing a user to provide a user indication indicating that the computer should not be placed in a low energy use power state;

and where such user indication is not provided, each software module will command its computer to enter a low energy power use state.

DETAILED DESCRIPTION OF EXEMPLARY VERSIONS OF THE INVENTION

Figure 1:
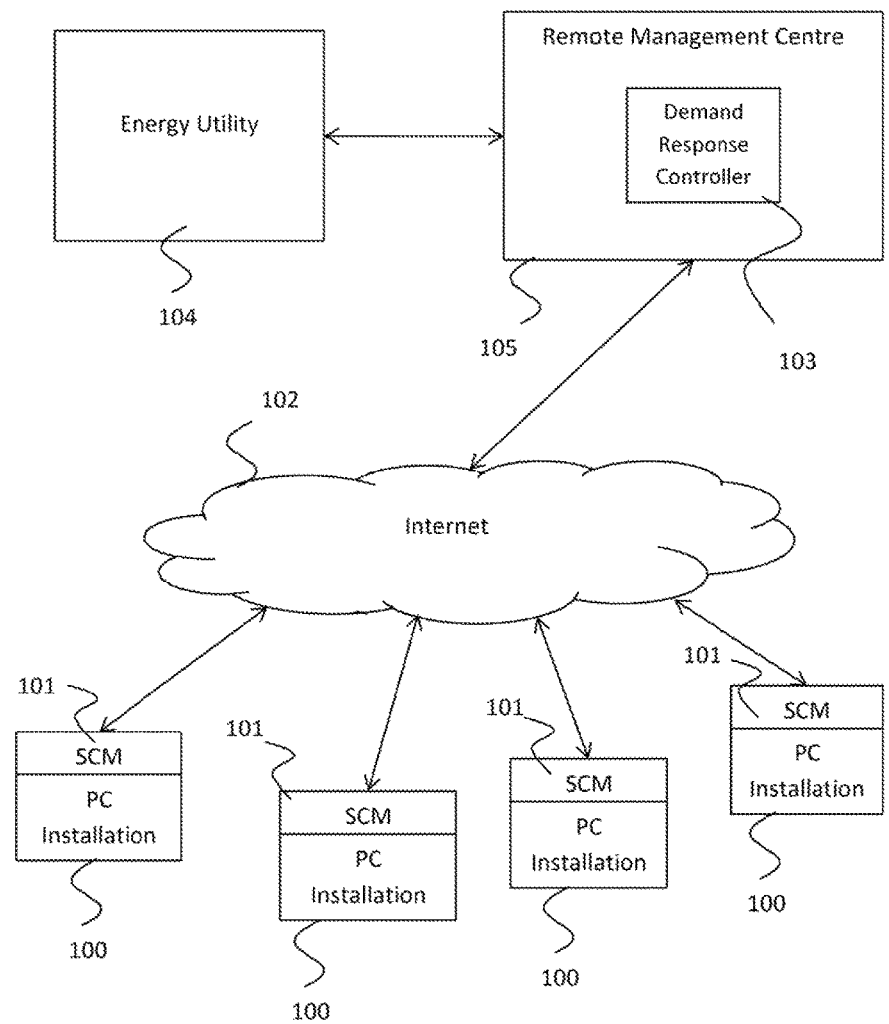
FIG. 1 is an illustration of the elements of the system of the invention.

Referring now to FIG. 1, there are a number of personal computer installations 100. These personal computers 100 may be installed in individual premises, or groups of computers 100 may be installed in a single premises. These computer installations 100 are supplied with electricity by an electricity supply network. At least some aspect of the electricity supply network is contributed by an Electricity Supply Utility 104. The Utility 104 may be any or all of an electricity retailer, an electricity generator, an electricity distributor and an electricity network regulator. There may be more than one Utility 104.

The Utility 104 provides or controls the provision of electricity to or by the electricity supply network. In a preferred version of the invention, the Utility 104 is an energy retailer. In high demand situations, energy retailers are forced to pay very high prices for electricity but are unable to pass these costs on to their customers. In such a situation, the Utility 104 wishes to reduce electricity consumption by customers connected to the electricity supply network. Other possible scenarios, including restricted electricity supply, or restricted electricity distribution capacity may cause a Utility 104 to wish to reduce electricity consumption by customers connected to the electricity supply network.

Each computer 100 includes a Software Control Module (SCM) 101. Each SCM 101 establishes communication with a Remote Management Centre (RMC) 105 via a communications network 102. The RMC 105 is a processing system remotely located from the personal computer installation 100. The RMC 105 is in communication with the Utility 104.

The RMC 105 includes a Demand Response Controller (DRC) 103. The DRC 103 may receive from the Utility 104 a demand response event notification, being an indication that a reduction in load on the electricity supply network is desirable. The DRC 103 is then able to issue a demand response event request to the personal computer installations 100. The demand response event request is intended to elicit a response from at least some of the personal computer installations 100 whereby the installations 100 move to a lower energy use state, thus relieving the load on the electricity supply network.

In preferred versions of the invention, the communications network is the public internet. The nature of the public internet is such that in general, a personal computer 100 will not have unrestricted, two way access to remote devices via the internet. Some form of firewall and/or network address translation (NAT) is likely to be in place. Accordingly, it is preferred that each Software Control Module (SCM) 101 will establish the link to the Remote Management Centre (RMC) 105, allowing two way communications.

The Remote Management Centre (RMC) 105 may be in communication with many thousands of personal computer installations 100. Maintaining communications links requires resources at both the personal computer 100 and the RMC 105. In order to reduce resource use, the link established between the RMC 105 and each computer may be held only briefly, for the time necessary for the computer 100 to identify itself, and to transfer data concerning energy usage by the computer installation 100, and for the RMC 105 to allow the Demand Response Controller (DRC) 103 to indicate that a demand response event is in progress if that is the case. The link is then dropped and re-established by the personal computer 100 at regular intervals. In a preferred version of the invention, the interval is between five and fifteen minutes. Alternatively or additionally, the Remote Management Centre (RMC) 105 may establish the communication link with some or all of the Software Control Modules (SCMs) 101. As another option, the link between the RMC 105 and the personal computer installations 100 may be permanently maintained.

Figure 2:
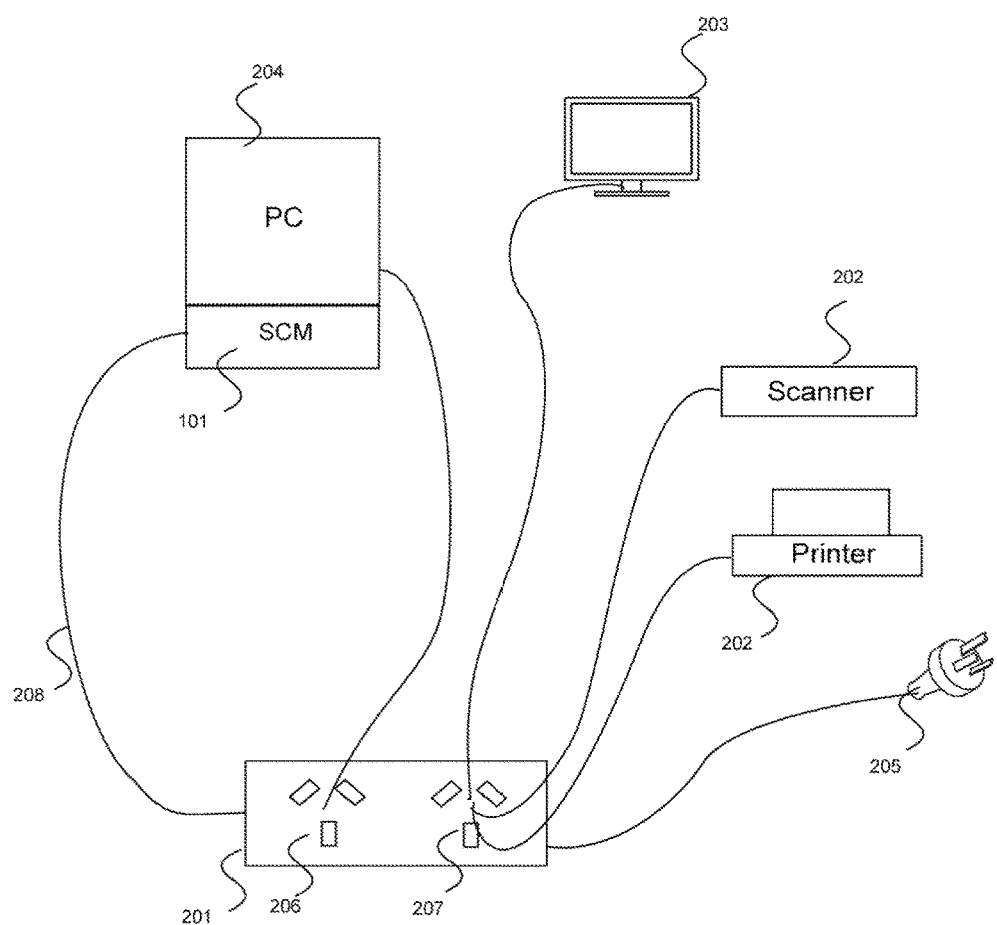
FIG. 2 is a representation of a home computer installation including the system of the invention.

FIG. 2 provides a diagram representing a typical personal computer installation 100 of FIG. 1. The personal computer installation 100 includes a computer 204, which has a monitor 203. The computer 204 may also have peripheral devices 202 attached, such as a printer or a scanner. The computer 204 runs the Software Control Module (SCM) 101 as previously described. Electricity is supplied to the computer 204, the monitor 203 and the peripheral device 202 via an energy saving device 201. An electrical plug 205 is connected to a General Power Outlet (GPO), which supplies electrical power to the energy saving device 201. The energy saving device 201 includes monitored electrical outlet 206 which supplies electrical power to personal computer (PC) 204. The term PC as used herein encompasses any suitable computing device, including without limitation, Apple Macintosh computers; computers running Unix based operating systems; and laptop, notebook and tablet computers.

A switched electrical outlet 207 provides electrical power to devices used in the computing environment which require power only when the personal computer (PC) 204 itself is in use. This includes, without limitation, the computer monitor 203 and computer peripheral equipment 202. It may also include equipment which is not part of the computer installation 100, but is nonetheless only required when the computer 204 itself is in use, such as a desk lamp. The term "computer peripherals," as used herein, is to be taken to include, without limitation, at least all of the foregoing.

The energy saving device 201 may include a communications channel 208 for communication to the personal computer (PC) 204, such as a USB channel. Other types of communication channels may be used, including, without limitation, wireless communication ports and protocols. Alternatively or additionally, communication between the energy saving device 201 and the PC 204 may not be direct, but may occur via a third device such as a communications server, or a public or private communications network, or any other suitable device or network.

Figure 3:
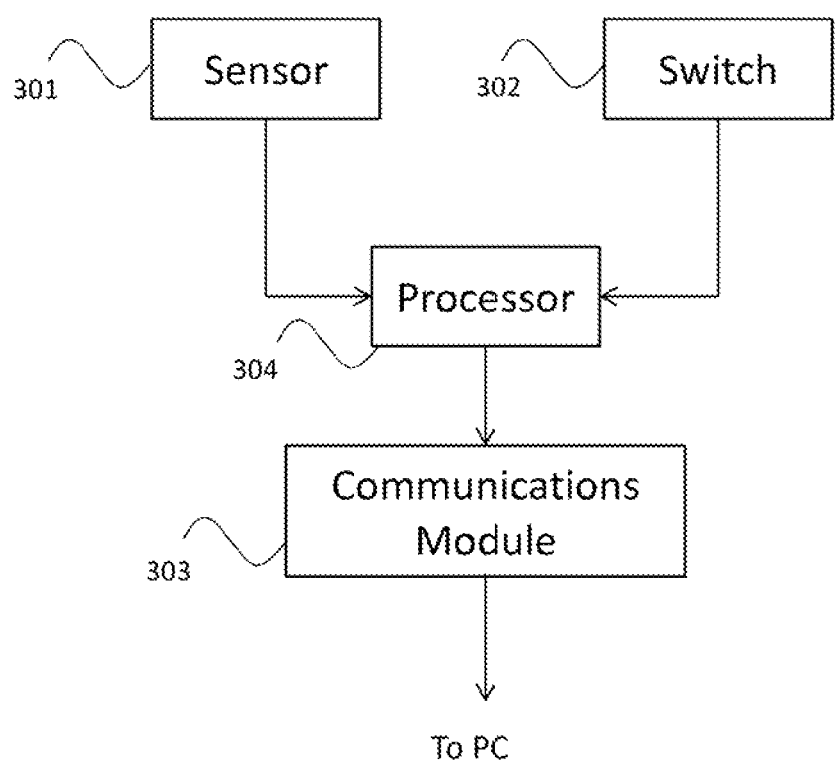
FIG. 3 is a block diagram of the energy saving device included in FIG. 2.

Referring to FIG. 3, which is a partial block diagram of the circuit of the energy saving device 201, a sensor 301 monitors the power drawn through the monitored electrical outlet 206. The sensor 301 may measure one or all of true RMS power, current, voltage and phase angle or power factor drawn by or across the load connected to the one or more monitored outlets 206. A switch 302 operates to control the connection of electrical power from the General Power Outlet (GPO) to the switched outlet or outlets 207. A communication module 303 provides data communication between the energy saving device 201 and the Software Control Module (SCM) 101 running on the PC 204. This may (for example) be a USB communications module, but any other suitable communication connection and protocol may be employed. A processor 304 receives the output of the sensor 301 and controls the switch 302. The processor 304 also receives data from, and sends data to, the SCM 101 via the communications module 303.

The processor 304 receives data from the sensor 301 describing the power being drawn through the monitored outlet or outlets 206 at any time. The processor 304 may use this data to calculate average power used over time. The processor 304 may also determine the aggregated power used over a period of time. This data is the power usage data for the energy saving device 201. The power usage data is communicated to the Software Control Module (SCM) 101 via the communications module 303.

In alternative versions of the invention, the communications module 303 may be incorporated into the processor 304. Alternatively, the processor 304 may be absent and the communications module 303 may provide for direct communication with the PC 204 by the sensor 301 and the switch 302. In these version, all functions of the processor 304 described herein are undertaken by software running on the PC 204 or another remote processor. In other versions, the sensor 301, processor 304 and communications module 303 functions may be provided by a single unit.

In use the output of the sensor 301 is monitored by the processor 304 to determine a functional state of the PC 204. The functional state may be determined from the characteristics and/or magnitude of the power drawn by the PC 204, as detected by the sensor 301. In a preferred version of the invention, small fluctuations over short time periods in the power supplied to the PC 204 through the energy saving device 201 are monitored. Any or all of relative magnitude, absolute magnitude and frequency of the fluctuations may be monitored. A greater level of power fluctuations indicates that the PC 204 is in active use. Lower levels of power fluctuations, or the absence of power fluctuations, indicate that the PC 204 is not in active use, although it may still be operating at full power. The fluctuations occur as a result of rapidly varying processor load and power drawn by such things as storage drives and graphics display units, which occur when the PC 204 is responding to input from a user.

In other versions of the invention, the functional state of the PC 204 may be determined by comparing the power drawn by the PC 204 through the energy saving device 201 to one or more pre-determined thresholds. These thresholds may include a time component, that is, meeting the threshold may require the power to be within a particular value range for a particular time. When the power drawn is below a certain threshold, the functional state of the PC 204 is determined to be the corresponding state.

In a preferred version of the invention, the processor 304 distinguishes at least three functional states of the PC 204. These are Active Use, Full Power Standby, and Low Power Standby. Active Use is detected when the PC 204 is in use, fully powered, and with a user interacting with or otherwise actively using the PC 204. Preferably, use which may not involve direct physical interaction with the PC 204, such as watching video material, or performing extended calculations, will be categorised as Active Use. Full Power Standby occurs when the PC 204 is fully powered, but is not being actively used by a user, that is, there is no user interacting with the PC 204. Low Power Standby occurs when the PC 204 has entered a low power state, in which the PC 204 is not performing any significant processing function. These may be called "sleep" or "hibernate". These low power states may be separately identified by the processor 304. This state detection may also include the condition when the PC 204 is off.

The determination of the functional state may include a duration component, that is, a change in state may be identified when a particular energy use situation has persisted for a given time period. The determination of a change in the determined functional state thus may not coincide in time with any specific change in the power usage of the PC 204.

In the preferred version of the invention, the PC 204 will be determined to be in Active Use functional state when a sufficiently high level of power fluctuations is detected, over a sufficiently short period of time. Relative and absolute power measurements may also be used. Full Power Standby will be determined to be the functional state of the PC 204 when there is a lower level of power fluctuation detected by the sensor for a sufficiently long period of time. A particular range of values of absolute or relative average power use by the PC 204 may also be required in order for the functional state of the PC 204 to be categorised as Full Power Standby by the energy saving device 201. The categorisation of the functional state of the computing device 204 as Full Power Standby indicates that the PC 204 is not being actively used by a user, but has not entered a low power standby mode.

The processor 304 will cause the switch 302 to operate to remove power from the switched electrical outlet 207 when Low Power Standby functional state is detected, thus removing power from the computer peripherals 202. This ensures that the computer peripherals 202 are not drawing power unnecessarily during at least some of the time when the PC 204 is not in use.

The PC 204 runs the Software Control Module (SCM) 101, which communicates with the energy saving device 201. This software 101 may run as a stand-alone program, as a service, as part of the computer operating system, or in any other convenient manner. It is a function of the SCM 101 to cause the PC 204 to move from Full Power Standby to Low Power Standby. This saves energy in itself. Further, the move to Low Power Standby provides the opportunity for the energy saving device 201 to remove the electricity supply to at least some components of the PC 204 installation, which saves yet more energy.

When the processor 304 determines the functional state of the PC 204 to be Full Power Standby, the processor 304 communicates this to the Software Control Module (SCM) 101 via the Communication Module 303. In the simplest version of the invention, this communication will be the single command "Hibernate", instructing the SCM 101 to cause the PC 204 to enter a low power standby mode, such as sleep or hibernate, if possible.

In some versions of the invention, the Full Power Standby and Low Power Standby states may not be distinguished. At any time when the functional state Active Use is not detected, the processor 304 may communicate this to the Software Control Module (SCM) 101.

The identification of Full Power Standby is made by inference from the pattern of energy usage by the PC 204. It is possible that Full Power Standby may be misidentified. A determination of Full Power Standby may be made when in fact the mode is Active Use, that is, a user is engaged with the PC 204. The user may be only partly engaged, but may not wish the PC 204 to move to Low Power Standby or to have power removed from the monitor 203 and other peripherals 202. It is important that a user not be unduly inconvenienced. Accordingly, the Software Control Module (SCM) 101 takes time—in a preferred version of the invention, on the order of 10-15 minutes—to move to Low Power Standby. In this time, warnings are provided which will be sensible to a present, fully or partly involved user, indicating that the move to Low Power Standby is imminent. Any interaction by the user with the PC 204 will be sufficient to prevent the move to Low Power Standby. In the case where a demand response event notification has been received, avoiding user inconvenience is a lesser priority, so warnings may be curtailed.

The sensor 301 detects the magnitude of the power use by the computer 204, which is communicated to the Software Control Module (SCM) 101. The energy use data may be collected at all times, including times when the computer 204 is in active use, and times when the computer 204 is in Low Power Standby. The energy saving device 201 may include memory, allowing power data obtained by the sensor 301 while the computer 204 is in a Low Power Standby mode to be stored and communicated to the SCM 101 when the computer 204 returns to an active use mode. The SCM 101 communicates power use data from the sensor 301 to the Remote Management Centre (RMC) 105. This data is further communicated to the Demand Response Controller (DRC) 103 to use to determine what power savings may be gained by a demand response event request directed to that PC 204.

The Remote Management Centre (RMC) 105 further uses this usage data to determine the total power usage, and patterns of usage, of all of the PCs 204 in communication with the RMC 105. This information may be made available to the Energy Utility 104 for load planning purposes.

The Remote Management Centre (RMC) 105 is able to determine which energy saving devices 201 have been installed, and that they continue to be installed. The installation of the energy saving devices 201 may have been made by the Energy Utility 104 or in response to incentives provided by the Energy Utility 104. The usage data allows the Energy Utility 104 to monitor the effectiveness of programs to install energy saving devices 201, including information as to which energy saving devices 201 continue to be installed and the power consumption of the devices connected to these energy saving devices 201.

In further version of the invention, a sensor 301 with multiple communications channels 208, or more than one sensor 301, may be provided. The additional channels 208 or 2o additional sensors 301 monitor the power drawn through the switched electrical outlet or outlets 207. The power drawn through the switched outlets 207 is the power drawn by the peripherals 202. The data describing the power drawn by the peripherals 202 is communicated to the Software Control Module (SCM) 101, and subsequently to the Remote Management Centre (RMC) 105, in the same way as the data describing the power drawn through the monitored outlet 206 is communicated. This data allows the Demand Response Controller (DRC) 103 to make a more accurate estimation of the power which will be saved in the event that the DRC 103 initiates a demand response event.

Figure 4:
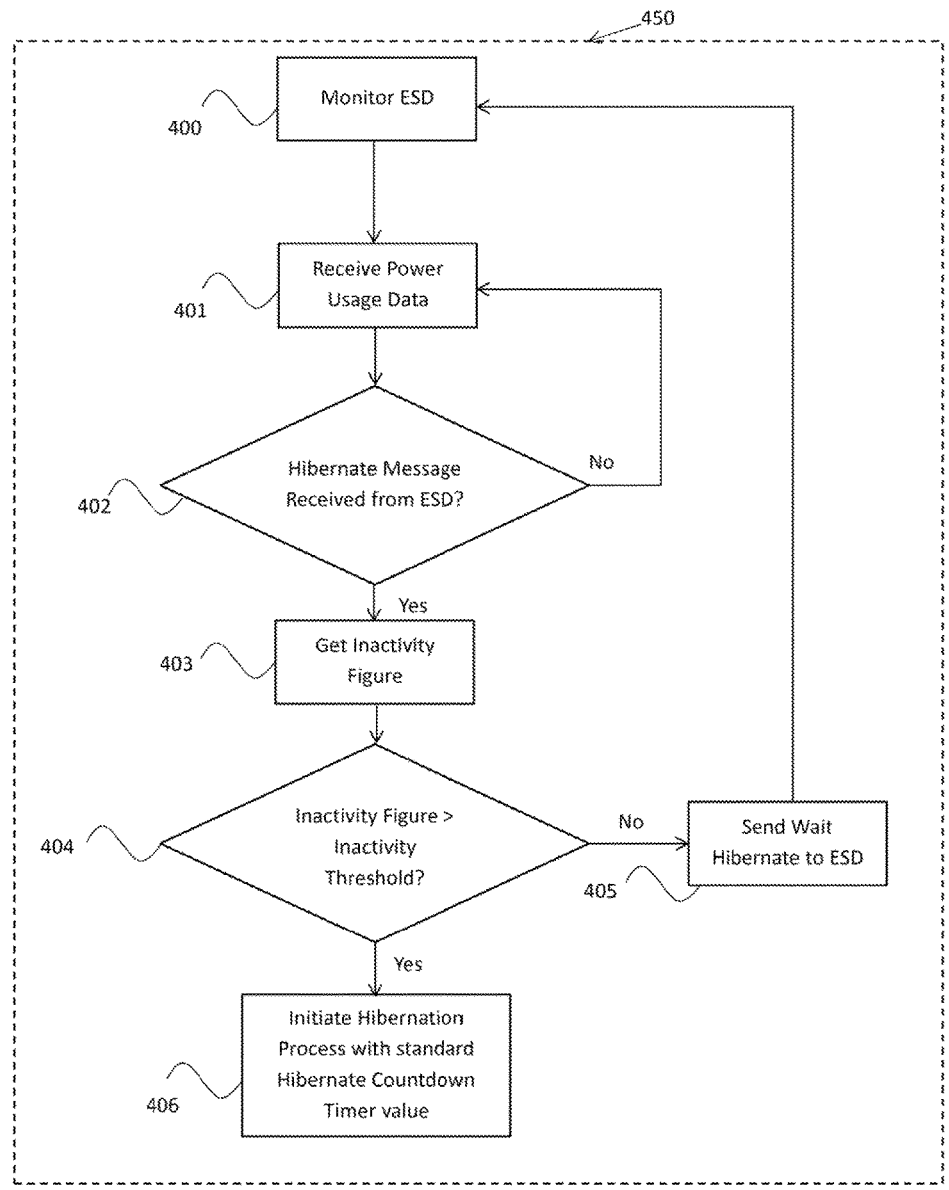
FIG. 4 is a flow chart describing the Energy Saving Device Interaction Process.

The Software Control Module (SCM) 101 runs three main processes. The first, shown in FIG. 4, is Interaction Process 450 performed on energy saving device 201. The SCM 101 performs the action Monitor Energy Saving Device 400 wherein the USB port, or other communication channel 208 of the PC 204, is monitored for incoming data communicated from the processor 304 of the energy saving device 201 via Communications Module 303. An incoming communication from the energy saving device 201 will be the power usage data described herein. This data is received at 401 by the SCM 101, and is stored for communication to the Remote Management Centre (RMC) as described herein. The SCM 101 may also analyse this data and display results of this analysis to a user, or communicate such results to the RMC.

Commands received from the energy saving device 201 are checked at 402 in order to detect a Hibernate command from the energy saving device 201. Where the command is not a Hibernate command, monitoring 400 continues. Where the command is a Hibernate command, the action Get Inactivity Figure 403 is performed. The action Get Inactivity Figure returns a value User Inactivity indicating the degree to which the PC 204 is not engaged in interactive activity with a user. In a preferred version of the invention, this is the length of time since the PC 204 has recorded a keystroke or a mouse movement. In the Microsoft Windows operating system, this value is available as the result of an API call, built in to the operating system. Similar results are available when other operating systems are employed. In other versions of the invention, other means of detecting user interaction may be employed. This may include, without limitation, detection of movement using a camera attached to or integral with the PC 204; detection of touch on a touchscreen or touchpad; detection of use of a game pad, joystick or other user input device; presence detection using passive or active infra-red sensors; and other suitable forms of presence detection. In these cases, User Inactivity is a value indicating the length of time since a user interaction with the PC 204 has been detected.

The User Inactivity value is then checked 404 against an Inactivity Threshold. In a preferred version of the invention, the Inactivity Threshold is a pre-set value which is the length of time that the PC 204 is to be allowed to remain in Active Standby before being placed into Low Power Standby. The threshold value may be set by default, or the Software Control Module (SCM) 101 may include a user interface which allows the Inactivity Threshold value to be set by a user. In a further version of the invention, the value of Inactivity Threshold may be communicated to the Interaction Process 450 by the energy saving device 201.

Where check 404 indicates that User Inactivity is greater than Inactivity Threshold, the Interaction Process 450 initiates the process Hibernation Process at 406. Where User Inactivity is less than Inactivity Threshold, a Wait command is communicated at 405, via the Communication Module 303, to the energy saving device 201. This communication includes a value Wait Hibernate which is the time period which must elapse before the energy saving device 201 will again send a Hibernate command to the Interaction Process 450. The value of Wait Hibernate is slightly more than Inactivity Threshold less User Inactivity. The processor 304 of the energy saving device 201 receives the value Wait Hibernate. No further Hibernate command will be sent from the energy saving device 201 to the Hibernate Process 406 until the Wait Hibernate time period has expired. This prevents the energy saving device 201 from repeatedly sending Hibernate commands which will be ignored because the PC 204 has not been in an Active Standby functional state for a sufficient period. Following the sending of the Wait command, the Interaction Process 450 continues from the Monitor Energy Saving Device function 400.

In other versions of the inventions, the Wait Hibernate value is not calculated nor sent to the energy saving device 201. The Energy Saving Device Interaction Process 450 simply returns to the Monitor Energy Saving Device 400 function to await the next Hibernate command. In this version of the invention, the energy saving device 201 will preferably include a fixed delay between sending of Hibernate commands to avoid overloading the Energy Saving Device Interaction Process 450 with redundant Hibernate commands.

The second process run by the Software Control Module (SCM) 101 is the Hibernation Process, which is the process whereby the PC 204 is placed into a Low Power Standby mode. The Hibernation Process provides a warning to a user that the PC 204 is about to be placed in a Low Power Standby mode. The user is given an opportunity to indicate that the PC 204 is in use and should not enter Low Power Standby. If no such indication is made, then the PC 204 is placed in Low Power Standby mode. In a preferred version of the invention, the warning is by way of a splash screen notification displayed on the monitor of the PC 204. In other versions of the invention, other visual or audible warnings may be used. These warnings include, without limitation, flashing lights, spoken word notifications and warning tones. The indication that the PC 204 should not be placed into Low Power Standby mode may be by an explicit choice, such as selecting a specific item from a displayed menu, or it may be assumed from any interaction with the PC 204, such as a keystroke or mouse movement.

Figure 5:
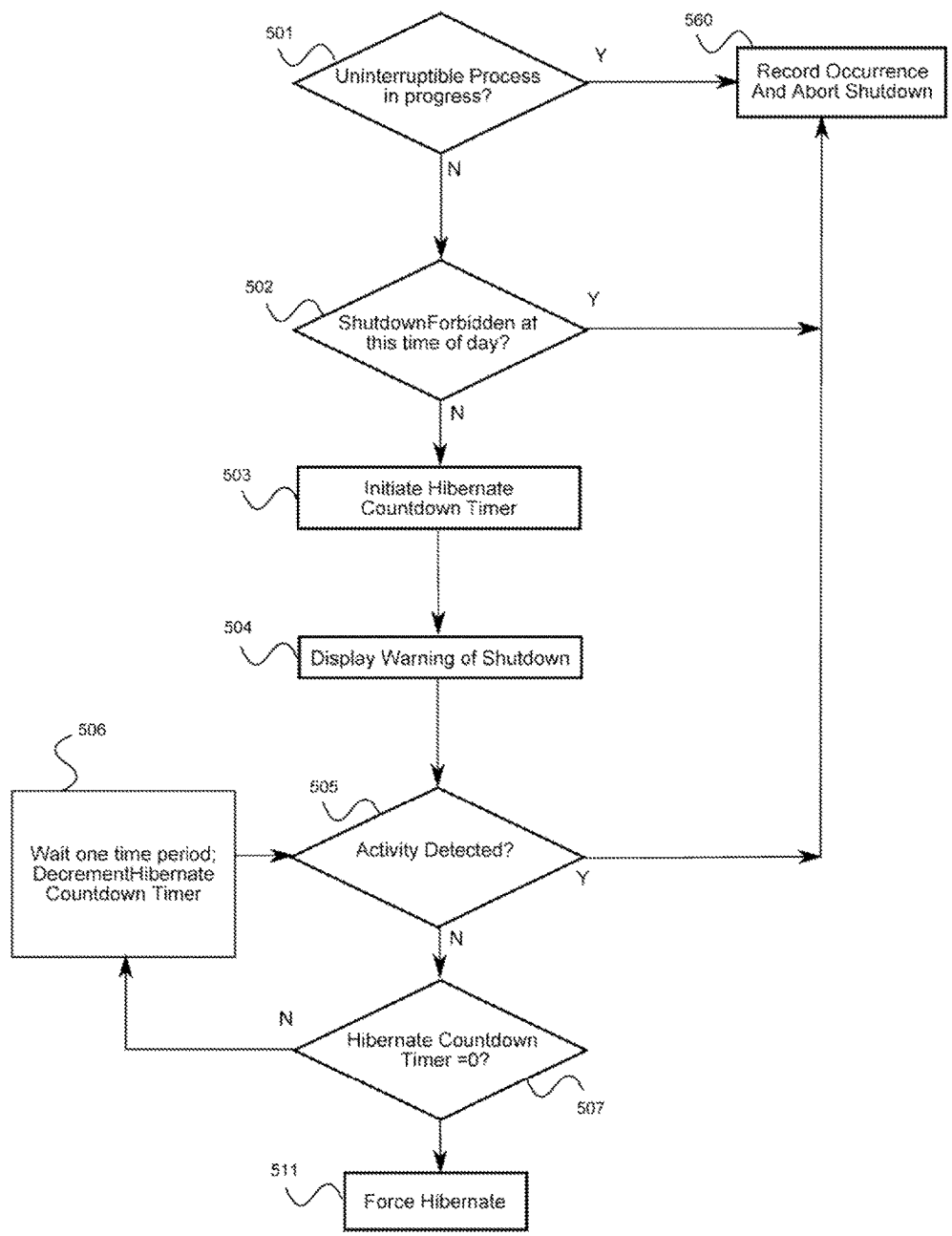
FIG. 5 is a flow chart describing the Hibernation Process.

The Hibernation Process is illustrated in the flowchart of FIG. 5. The Hibernation Process begins with a check 501 to determine if any uninterruptible process is running. This check 501 is made by checking the status of operating system flags which allow a process to indicate that the process is running and should not be interrupted. Where check 501 indicates that an uninterruptible process is in progress, the occurrence is logged and the shutdown process is aborted at 560.

Where no uninterruptible process is detected, the Hibernation Process continues to make any other relevant checks to ensure that the PC 204 should be shut down if the period of Active Standby continues. In the illustrated version of the invention there is a check for the time of day 502. The Software Control Module (SCM) 101 may include a user interface which allows a user to set certain time periods during which no shutdown will take place, for example, Monday to Friday from 9:00 AM to 5:00 PM when it is known that the PC 204 may be required for use on short notice and it is desired to avoid the PC 204 being shut down. Where check 502 indicates that the time of day is such that shutdown should not take place, the occurrence is logged and the Shutdown Process is aborted 560.

Where no impediment to moving the PC 204 into a Low Power Standby mode is discovered, the process Initiate Hibernate Countdown Timer 503 is entered. A Hibernate Countdown Timer is set to a starting value. This starting value may be set by default or may be able to be pre-set by a user or by an external process. In a preferred version of the invention, the value is set to ten minutes. This is the length of time during which the user is able to indicate that they are interacting with the PC 204 and that they do not wish the PC 204 to be placed into Low Power Standby mode. If no user is present, no such indication will be made, and the PC 204 will be put into a Low Power Standby mode.

Figure 7:
FIG. 7 is a warning splash screen displayed by a version of the invention.

A warning of impending shutdown is then displayed at 504 as a splash screen on a PC 204 monitor. An example warning is shown in FIG. 7. The text of the warning indicates that the PC 204 will shortly be placed into a nominated Low Power Standby mode, which may be "sleep" or "hibernate" or any other suitable low power use mode of operation. The text invites a user to interact with the PC 204, by keystroke or mouse movement, in order to prevent the change in mode. The time left before shut down, being the value of the Hibernate Countdown Timer, may also be displayed.

The process then continues with a check 505 for any user interaction in response to the warning. If user interaction is detected, the Hibernate Process is then cancelled at 560. No shutdown takes place.

A check 507 is then made to see if the Hibernation Countdown Timer has reached zero. If no user interaction is detected, the Hibernate Countdown Timer is decremented at 506 according to the elapsed time. A further check is then made at 505. This continues until either user interaction is detected by check 505, or the value of the Hibernate Countdown Timer is found to be zero at check 507. When the Hibernate Countdown Timer reaches zero, the action Force Hibernate 511 is undertaken. This may be achieved by causing the operating system of the PC 204 to place the PC 204 into a Low Power Standby mode which may be "sleep" or "hibernate". Alternatively, the Software Control Module (SCM) 101 may control the low power state directly. The SCM 101 may individually instruct the hardware of the PC 204, such as hard drives, to enter low power states or to have power removed from them. The SCM 101 may instruct the PC 204 to end, suspend or hibernate individual processes or classes of process. In any case, the power usage of the PC 204 will be lowered to a state identifiable as Low Power Standby. It is a function of the energy saving device 201 that the processor 304 will cause the switch 302 to operate to remove power from the switched electrical outlet 207 when Low Power Standby functional state is detected, thus removing power from the computer peripherals 202.

When the PC 204 is forced into Low Power Standby by the Energy Saving Device Interaction Process 450, the power draw characteristics sensed by the sensor 301 are analysed by the processor 304 to identify that the PC 204 is in Low Power Standby mode. The processor 304 then controls the switch 302 to remove power from the switched electrical outlet 207, thus removing power from the computer peripherals 202 which are not needed when the PC 204 is not in use.

Movement of the mouse, activation of the keyboard, or pressing the power on button on the PC 204 will bring the PC 204 out of Low Power Standby mode in the usual manner. The energy saving device 201 will detect this change in functional state. The processor 304 will then operate the switch 302 to return power to the switched electrical outlet 207, returning power to the computer peripherals 202.

The terms keystroke and mouse movement as used herein include analogous actions performed using other hardware, including without limitation, virtual keyboards, touchscreens, touchpads, trackballs and thumbwheels.

In a preferred version of the invention, the Software Control Module (SCM) 101 is coded to select "sleep" as the Low Power Standby mode. In other versions of the invention, the Energy Saving Device Interaction Process 450 may include a user interface which allows a user to pre-set which mode should be chosen.

In other versions of the invention, the display of the user warning may include an option to cause hibernation immediately, without waiting for the Hibernate Countdown Timer to count down. There may also be an explicit option which must be selected to prevent shutdown, beyond merely moving a mouse or providing a key stroke.

In other versions of the invention, other measures indicating that the PC 204 is in use, even if there is no user interaction, may be used in setting the value of User Inactivity. This may include, without limitation, the load on the processor 304 of the PC 204, the throughput of any I/O (input/output) ports, and whether the display of the computing device 204 is active. These other measures may be used to directly set or to modify User Inactivity such that it is more or less likely to exceed the threshold and cause the PC 204 to be instructed to enter a low power standby mode. For example, a high level of processor load, indicating active use, may cause the User Inactivity value to be decreased, meaning that a longer period without a user physically interacting with the PC 204 would be required before the process Hibernation Process is initiated.

Figure 6:
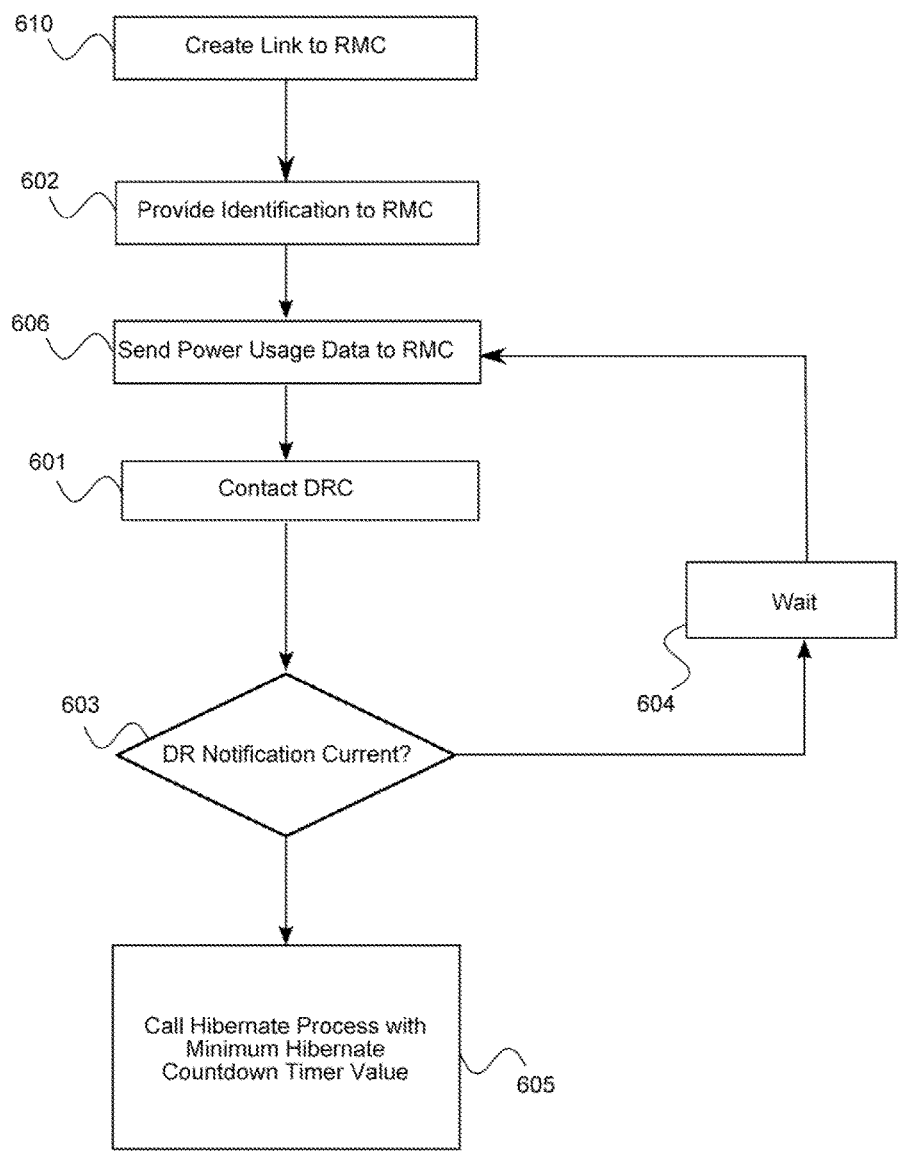
FIG. 6 is a flow chart describing the Cloud Communication Process

The third process run by the Software Control Module (SCM) 101 is the Cloud Communication Process shown in FIG. 6. This process enables communication with the Remote Management Centre (RMC) 105 to provide power usage data to the RMC 105. This communication also extends to the Demand Response Controller (DRC) 103 in order for the PC installation 100 to participate in a demand response event.

In use, the Energy Utility 104 identifies a need to reduce load on the electricity supply network. The Utility 104 requests the Demand Response Controller (DRC) 103 to issue a demand response event notification. As each of the PCs 204 running the Software Control Module (SCM) 101 contacts the DRC 103, each is instructed to move to a Low Power Standby state if possible.

The first step in the Cloud Communication Process is Create Link to Remote Management Centre (RMC) 610. The process uses the PC's internet connection to create a link to the RMC 105. The internet address which the process attempts to connect to is pre-set at the time of installation of the Software Control Module (SCM) 101. It is preferred that the SCM 101 initiate contact rather than the RMC 105 to avoid the need to negotiate firewalls and network address translation (NAT) devices which could make the SCM 101 difficult or impossible to locate from the public internet. In the preferred version of the invention, communication is via the public internet, but any other network available to both the SCM 101 and the RMC 105 may be used.

As part of the link creation (or separately) the Software Control Module (SCM) 101 identifies itself to the Remote Management Centre (RMC) 105 at 602. This may be via an externally provided digital certificate, a unique identifier, or any other suitable identification process. It is preferred that no user action is required at any point in the identification process. The identification is matched by the RMC 105 to a database of SCM PC installations. This database includes such information as the electricity supply network to which the PC installation 100 is connected, and any overall restriction on the participation of the installation in demand response events. The database may also include sufficient information about the installation 204 to allow an estimate of the energy savings available from the participation of the installation 204 in a demand response event. In a preferred version of the invention, information about the PC installation 100, held by the RMC database, will have been collected by the installer of the SCM 101 and supplied to the RMC 105 at the time of installation. In an alternative version of the invention, these details are communicated to the RMC 105 by the SCM 101.

As seen at 606, the Cloud Communication Process sends power usage data as described herein to the Remote Management Centre (RMC) 105. The RMC 105 receives power usage data from many Software Control Modules (SCMs) 101. This data is combined with the information concerning the Utility 104 supplying power to the PC 204 connected to each energy saving device 201, and the physical location of the PC 204, to determine characteristics of the power consumption of the PC 204 both instantaneously and as a function of time. The RMC 105 uses this data to model power usage over the PCs 204 with which it is in communication. This may include predictions of future power use, reporting of current power use, and predictions of the magnitude of power reduction which could be achieved at a given time and place should such a reduction be desired by a Utility 104.

The Remote Management Centre (RMC) 105 includes a Demand Response Controller (DRC) 103. The DRC 103 may receive from the Utility 104 a demand response event notification, being an indication that a reduction in load on the electricity supply network is desirable. The DRC 103 is then able to issue a demand response event request to the personal computer installations 100. The demand response event request is intended to elicit a response from at least some of the personal computer installations 100 whereby the installations move to a lower energy use state, thus relieving the load on the electricity supply network.

The Remote Management Centre (RMC) 105 may service more than one Utility 104. In a preferred version of the invention, each PC installation 100 is associated with one Utility 104. Demand response event notifications will only be passed to the Software Control Module (SCM) 101 of a PC installation 100 when the event has been requested by the associated Utility 104.

In an alternative version of the invention, a PC installation 100 may be associated with more than one Utility 104. The PC installation 100 may be informed of demand response events for each associated Utility 104. The identity of the Utility 104 requesting the demand response notification may be passed to the SCM 101 along with the notification.

The Cloud Communication Process makes contact 601 with the Demand Response Controller (DRC) 103. The Process then checks (at 603) with the DRC 103 to ascertain if a demand response event notification relevant to the PC installation 100 is current. If there is no current event, the process waits at 604 for a period of time before again sending usage data to the RMC 105. In a version of the invention where the link to the RMC 105 is broken and remade for each communication, it is at this point that the link is broken before, and remade after, the Wait step.

Where it is determined that there is a relevant demand response event in progress, at 605 the process calls the Hibernate Process. This call to the Hibernate Process specifies that the Hibernate Countdown Timer should be set to a minimum value. In a preferred version of the invention, this value is 30 seconds.

In an alternative version of the invention, the result of determining that a demand response event is in progress is to set the value of the Inactivity Threshold of decision point 404 to a very low number, for example thirty seconds. This will ensure that if the PC 204 is determined to be inactive for even a short period, the Hibernation Process will be called. The Hibernate Countdown Timer may also be set to a minimum value.

The Hibernate Process then runs normally. The reduced Countdown Timer value ensures that the PC 204 is moved into Low Power Standby almost immediately where there is no user engagement with the PC 204. Where there is user engagement, the user will indicate that the PC 204 should not be shut down by reacting to the displayed shutdown warning, thus preventing the shutdown.

In a preferred version of the invention, the shutdown warning is displayed when the impending shutdown is in response to a demand response event notification. In a version of the invention where the identity of the Utility 104 is passed to the Software Control Module (SCM) 101 by the Demand Response Controller (DRC) 103, this identity may also be displayed. Where the shutdown is in response to a demand response event notification, a user may wish to participate by allowing the PC 204 to be put into a standby mode even though this would otherwise be inconvenient. Therefore, in this version of the invention, the Hibernation Process is called whenever a demand response notification is received, regardless of the activity level of the PC 204. The shutdown warning includes a facility allowing the user to explicitly accept or reject the option of allowing the PC 204 to be placed in standby to participate in the demand response event.

In a preferred version of the invention, immediately prior to the Force Hibernate step 511 of the Hibernate Process, the fact that the PC 204 is about to be shut down will be communicated to the Demand Response Controller (DRC) 103. This may occur in all cases, or only when the shutdown occurs in response to a demand response event notification.

In another version of the invention, the energy saving device 201 includes a power sensor 301 to sense the power consumption of the peripheral devices 202 connected to the switched outlet 207. The device further includes a capability to communicate the sensed power consumption by the peripherals 202 to the Software Control Module (SCM) 101. The SCM 101 communicates this information to the Remote Management Centre (RMC) 105.

In any version of the invention, the Remote Management Centre (RMC) 105 may receive information about the estimated power consumption of each PC installation 100. This may be received directly from the Software Control Module (SCM) 101 reporting measured energy consumption as measured by the energy saving device 201, or it may be information from a database indicating what devices were found to be part of the PC installation 100 at the time the SCM 101 was installed.

The connection of each Software Control Module (SCM) 101 indicates that the respective PC installation 100 is not in a Low Power Standby mode. Where an SCM 101 has not linked to the Remote Management Centre (RMC) 105 for a period longer than the delay period of step 604 of FIG. 6, the RMC 105 may infer that the PC installation 100 is in a low power state. In any case, the particular installation will not be able to be instructed to join a demand response event. The RMC 105 may also receive notification directly from the SCM 101 that the PC 204 will immediately be put into a Low Power Standby state.

The Remote Management Centre (RMC) 105 uses this information to estimate the possible energy savings which could be achieved in response to a demand response event notification. This estimate is made available to the Utility 104, to be used in deciding to request a demand response notification.

When the PC 204 returns to use from a shutdown condition, the Software Control Module (SCM) 101 will make contact with the Remote Management Centre (RMC) 105. The RMC 105 can then determine that the PC 204 is not in a Low Power standby state. The information about which PC installations 100 were shut down, with the information concerning when the installation returned to use, is communicated to the Demand Response Controller (DRC) 103 which enables the DRC 103 to calculate what magnitude of energy was saved over what period. This is reported to the RMC 105 and hence to the Utility 104. The Utility 104 may pay the RMC 105 for this energy saving.

The Demand Response Controller (DRC) 103 may have information concerning the geographical location of the customers having the Software Control Module (SCM) 101 installed. This may be used to allow the Utility 104 to restrict the demand response event notification to a particular area where, for example, the need to reduce demand is related to a distribution problem affecting only a limited area.

The Demand Response Controller (DRC) 103 may be in communication with Software Control Modules (SCMs) 101 from PC installations 100 provided with electricity from a variety of supply networks and customers of a variety of Utilities. Each Utility 104 will be provided information only about installations which are connected to its network or belonging to its customers.

Installation of the Software Control Module (SCM) 101 and the corresponding energy saving device 201 may be financed by the owner of the Remote Management Centre (RMC) 105 or by the Utility 104. The cooperation of the consumer who owns the PC installation 100 may be obtained by providing the energy saving device 201 free of charge or at a reduced price. Other financial inducements or non-financial inducements may be provided to the customer to allow the installation of the SCM 101, and to participate in demand response events.

The Software Control Module (SCM) 101 may include a user interface allowing a customer to indicate that they wish to be notified of any demand response event, and given the opportunity to participate. In this version of the invention, the SCM 101 will display the shutdown warning whenever a demand response event notification is received, regardless of the power mode of the computer. Thus customer will then be given the opportunity to respond by either giving or refusing permission for shutdown to take place. There may also be given an indication of the duration of the event, allowing the customer to avoid bringing the PC 204 out of shutdown for that period of time. Where this is combined with the ability of the Demand Response Controller (DRC) 103 to record when the PC installation 100 returned to use, the DRC 103 can verify that an installation participated fully in the demand response event. The Remote Management Centre (RMC) 105 owner or the Utility 104 may provide some form of payment or reward for this participation.

A user may wish to participate in demand response events, but may not be in a position to allow the computer 100 to be shutdown. Many computers have energy saving features which allow for energy to be saved without shutting down the computer 100. These include, without limitation, such features as the ability to dim screens and monitors and to reduce CPU speeds. There may also be a capacity to spin down some or all hard drives. Devices with multiple GPUs may have a capacity to switch to a GPU which has lower performance and hence lower energy use. Fan operation may be reduced, either by the reduced energy consumption placing less strain on the cooling system, or by direct command. Operating temperatures may be permitted to rise temporarily to reduce fan use. Ethernet or other high speed communication channel use may use significant energy and there may be a capacity to slow communications rates to save energy.

In a version of the invention, the Software Control Module (SCM) 101 defines a reduced energy use power use state which is defined by implementing at least one energy saving feature such as those listed previously. In a preferred version of the invention the reduced energy use power use state is made up of a suite of settings for such features. The SCM 101 may implement a user interface which allows a user to define the characteristics of the reduced energy use power use state. This user interface allows the user to predetermine whether the reduced energy power use state is available in response to a Demand response event.

Figure 8:
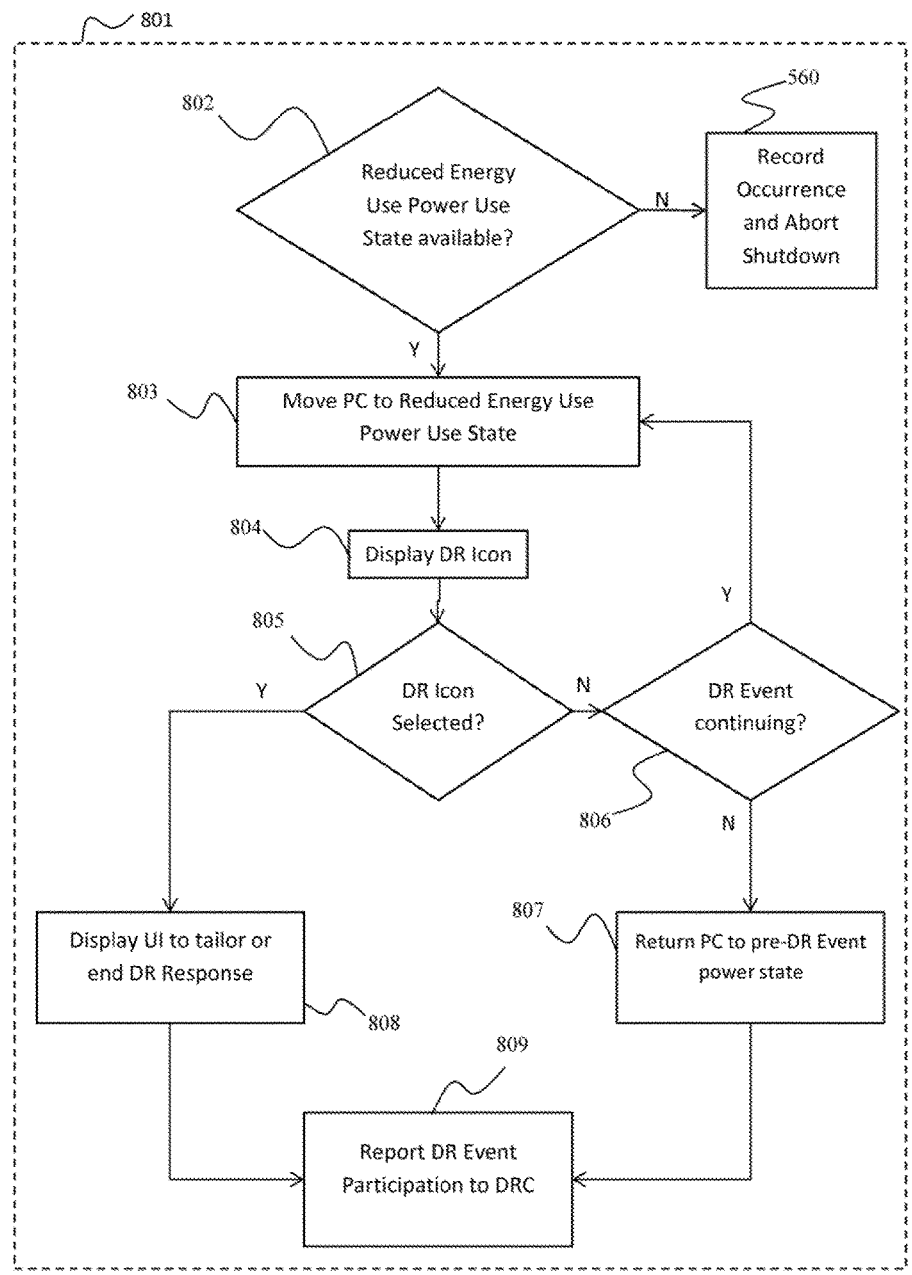
FIG. 8 is a flow chart describing the Reduced Energy Use Process.

Referring to FIG. 5, in this version of the invention, the function block "Record Occurrence and Abort Shutdown" 560 is replaced by process Reduced Energy Use Process 801 shown in FIG. 8. This process is entered only when a demand response event is in progress, and the option to cause the PC 204 to hibernate has been rejected. The process checks at 802 whether the option to use the reduced energy power use state is available. If it is not, then the occurrence is logged and the shutdown is aborted at 560. If the reduced energy power use state is available, at 803, the Software Control Module (SCM) 101 commands the PC 204 to move to the reduced energy use power use state.

The reduced energy power use state may not always be convenient for the user. In order to avoid the user permanently disabling this function, reducing the available energy saving during a demand response event, it is important that the user be provided with a convenient way to curtail use of the reduced energy power use state. The Software Control Module (SCM) 101 will display a user interface element which will give access to a user interface which will permit tailoring of the reduced energy use power use state or withdrawal from the demand response event. In the illustrated version of the invention, a DR Icon is displayed at 804 in the system tray of a Windows operating system, showing that a demand response event is in progress.

The DR Icon awaits selection at 805. While the DR Icon is not selected, the PC 204 continues to operate in the reduced energy use power use state.

The Software Control Module (SCM) 101 continues to communicate with the Demand Response Controller (DRC) 103 as described in FIG. 6. At 806, the SCM 101 checks to determine whether the demand response event is still in progress. While the demand response event continues, the SCM 101 continues to display the DR Icon (at 804).

When the Software Control Module (SCM) 101 determines that the demand response event is not continuing, the SCM 101 then returns the PC 204 (at 807) to the power state which it was in prior to the demand response event.

If the user selects the DR Icon at 805, the Software Control Module (SCM) 101 will display (at 808) a user interface which allows the user to adjust the parameters of the reduced energy use power use state or to withdraw from the demand response event. The SCM 101 implements any user instructions received through this user interface, changing the power use parameters, or, if the user wishes to withdraw from the demand response event response, returning the PC 204 to the power state it was in before the demand response event.

The participation of the PC 204 in the demand response event, whether the PC 204 participated in the demand response event for the full duration of the event, withdrew from the event, or changed parameters during the event, is reported to the Demand Response Controller (DRC) 103. This enables the DRC 103 to calculate the energy savings contributed to the demand response event by the PC 204. The Remote Management Centre (RMC) 105 or the Utility 104 may provide some form of payment or reward based on the level of participation and the energy saved by that participation.

Figure 9:
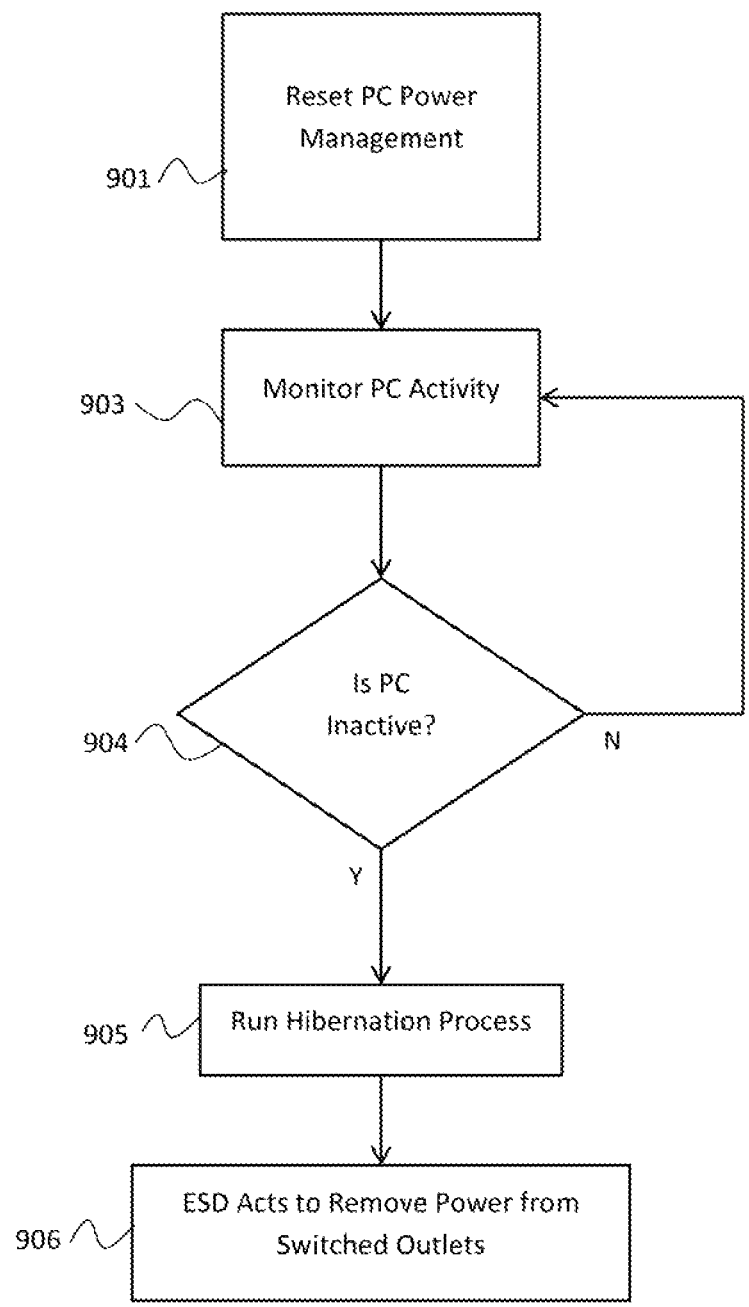
FIG. 9 is a flow chart describing the PC Activity Monitor process in a version of the invention.

Referring to FIG. 9, there is shown a flowchart of the operation of the PC Activity Monitor process of a version of the invention of the Software Control Module (SCM) 101 software. The PC Activity Monitor process runs in parallel to the process of FIG. 4.

The Software Control Module (SCM) 101 software runs on the PC 204. Upon initiation, the SCM 101 runs the process Reset PC Power Management 901. PC operating systems include power management features which cause the PC 204 to enter various lower power states depending upon the activity level of the PC 204. In order for the SCM 101 process to control the power management of the PC 204, the process Reset PC Power Management 901 disables power management features, or sets the activation parameters of such features to values which ensure the features will never activate while the SCM 101 controls the power management of the PC 204.

The Software Control Module (SCM) 101 then runs the process Monitor PC Activity 903. This may use the process described in FIG. 4, where an Inactivity Figure is obtained and compared to a threshold value. In addition or alternatively, the process Monitor PC Activity 903 directly monitors use of mouse, keyboard and other inputs, the level of use of PC 204 resources such as processor capacity, and any flags which may be set by the operating system to indicate that the PC 204 is in use. The results of this monitoring activity are used to determine at 904 whether the PC 204 is inactive. If the PC 204 is not inactive, the monitoring continues at 903.

Where the PC 204 is determined to be inactive, the Hibernation Process of Figure S is initiated at 905. When the Hibernation Process runs and moves the PC 204 into a low power standby state, the energy saving device 201 acts (at 906) to remove power from the switched outlets 207.

An advantage of having control of the power management taken by the Software Control Module (SCM) 101 is that the low power standby mode can be the lowest possible power usage mode. Low power usage modes consist of disabling or reducing power to various hardware and software components of the PC 204. The modes provided by the operating system, such as "sleep" and "hibernate," may not be the optimum for reducing power consumption. Direct control of the individual components of the power saving mode allows the SCM 101 to achieve optimal power reduction.

Figure 10:
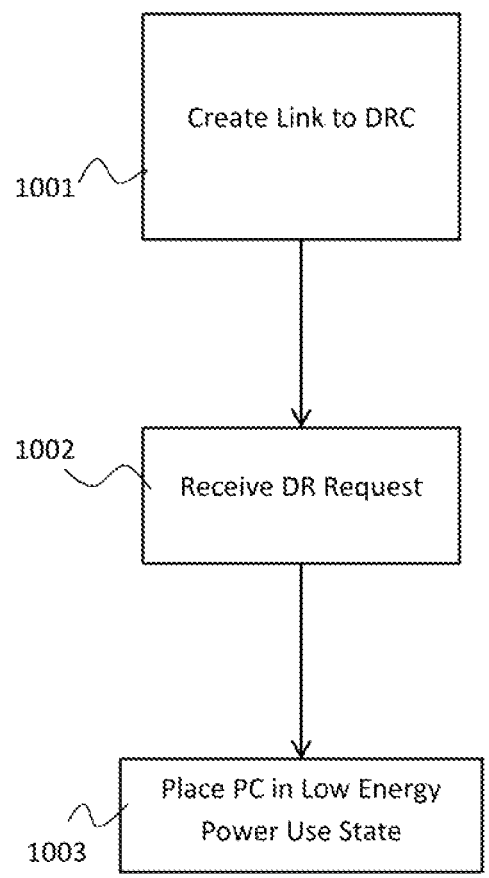
FIG. 10 is a flow chart describing overall operation of the SCM of FIG. 1 in a version of the invention.

In a version of the invention illustrated in FIG. 10, the Software Control Module (SCM) 101 acts (at 1001) to create a link directly to a remote Demand Response Controller (DRC) 103. The DRC 103 may be managed by any party having an interest in energy saving, including without limitation an energy retailer, an electricity distributor, or a Government agency.

When the manager of the Demand Response Controller (DRC) 103 requires a reduction in energy usage across the electricity network, the DRC 103 will issue a demand response request. The Software Control Module (SCM) 101 will receive (at 1002) the demand response request. In response to the demand response request, the Software Control Module (SCM) 101 will cause (at 1003) the computer to enter a low energy power use state.

In other versions of the invention, the data link 208 between the Software Control Module (SCM) 101 and the energy saving device 201 may be absent, or the energy saving device 201 may be completely absent. In this case, the energy saving device 201 monitoring process acts as an inactivity monitor. Referring to FIG. 4, the process begins from the Get Inactivity Figure (step 403). The step 405 becomes a delay step between checks of the inactivity figure at 403.

In other versions of the invention, the Energy Saving Device Interaction Process 450 may directly instruct the processor 304 or the switch 302 to remove power from the switched electrical outlet 207 before the PC 204 is placed into a Low Power Standby mode.

In a further version of the invention, the energy saving device 201 may be adapted to remove power from both the peripherals outlet 207 and the monitored outlet 206 when the Low Power Standby mode is detected. This allows the standby energy consumption of the PC 204 itself to be saved also. In this case, an interrupt is provided to allow a user to indicate to the energy saving device 201 that they wish to use the PC 204 and that power should be returned to the monitored outlet 206. The interrupt may be a user operated device such as a push button, or it may be a device for detecting user presence, such as a movement detector.

In a further version of the invention, the functions of the monitored and peripherals outlets 206 and 207 are combined in a single type of outlet, with the interrupt supplied. One or more such combined outlets may be provided. Multiple devices may be powered through a single such socket by use of a power board.

The energy saving device 201 may take any desired form but preferably is a power board, a general power outlet (GPO), a wall plug or an energy centre. It is preferred that the system or method of the invention are used in connection with "plug-in" electrical devices, but the system or method may also be used with electrical devices which are permanently wired to mains electrical power. In the latter case, the energy saving device 201 could be incorporated into the mains wiring infrastructure or incorporated as an integral part of mains powered equipment.

Although the invention has been herein shown and described in what is conceived to be the most practical and preferred versions of the invention, it is recognised that departures can be made within the scope of the invention, which is not to be limited to the details described herein but is to be accorded the full scope of the disclosure so as to embrace any and all equivalent devices and apparatus.

What is claimed is:

1. A system for reduction of electricity usage in an electricity supply network of an electricity supply utility, the system including a personal computer configured to:
   a. create a data link to an external remote management center, wherein the external remote management center:
      (1) is in data communication with the electricity supply utility, and
      (2) includes a demand response controller adapted to:
         (a) receive a demand response event notification from the electricity supply utility, the demand response event notification being a notification that the electricity supply utility is seeking a reduction of electricity usage in the electricity supply network, and
         (b) provide a demand response event request, the demand response event request being a request for a reduction of electricity usage;
   b. receive the demand response event request from the demand response controller;
   c. upon receipt of the demand response event request, command the personal computer to enter a low energy use power state;
   d. receive an indication from an energy saving device that the energy saving device is installed, wherein the energy saving device:
      (1) monitors power drawn by the personal computer, and
      (2) controls power supply to at least one peripheral of the personal computer,
      and wherein the personal computer communicates the indication to the remote management center.

2. The system of claim 1 further configured to:
   a. monitor an activity level of the personal computer to determine whether the personal computer is in an active use mode;
   b. upon determining that the personal computer is not in the active use mode for a time period exceeding a threshold time period, activate a user interface on the personal computer allowing a user to provide a user indication that the personal computer should not be placed in a low energy use power state;
   c. upon receipt of the demand response event request, activate the user interface allowing the user to provide the user indication indicating that the personal computer should not be placed in the low energy use power state;
   d. where such user indication is not provided by the user, command the personal computer to enter the low energy use power state.

3. The system of claim 2 further configured to command the personal computer to enter a reduced energy use power use state when such user indication that the personal computer should not be placed in a low energy use power state is provided, the reduced energy use power use state being an operational state wherein the personal computer has greater energy use than when the computer is in the low energy use power state.

4. The system of claim 2 further configured to communicate the user indication to the demand response controller, whereby the demand response controller can determine that the personal computer will not be placed in the low energy use power state.

5. The system of claim 1 further configured to:
   a. receive, from an energy saving device monitoring power drawn by the personal computer, power usage data describing the power usage of the personal computer, and
   b. communicate the power usage data to the remote management center.

6. The system of claim 2 further configured to activate the user interface following the demand response request only when the computer is determined to be outside the active use mode.

7. The system of claim 1 further including an energy saving device including:
   a. an electrical inlet configured to connect to a general power outlet,
   b. a monitored electrical outlet configured to connect to, and to supply electrical power to the computer,
   c. a peripherals electrical outlet configured to connect to, and to supply electrical power to, a peripheral device,
   d. a switch configured to control electrical connection of the electrical inlet to the peripherals electrical outlet, and thus to control supply of electric power to the peripheral device,
   e. a sensor configured to sense at least one characteristic of electrical power supplied through the monitored electrical outlet to the computer,
   wherein the switch is configured to remove power from the peripherals electrical outlet when the sensor detects that the computer has entered the low energy use power state.

8. The system of claim 1 further including an energy saving device including:
   a. an electrical inlet configured to connect to a general power outlet,
   b. a monitored electrical outlet configured to connect to, and to supply electrical power to the computer,
   c. a peripherals electrical outlet configured to connect to, and to supply electrical power to, a peripheral device,
   d. a switch configured to control electrical connection of the electrical inlet to the peripherals electrical outlet, and thus to control supply of electric power to the peripheral device,
   e. a sensor configured to sense at least one characteristic of electrical power supplied through the monitored electrical outlet to the computer,
   wherein the switch is configured to remove power from the monitored electrical outlet when the sensor detects that the computer has entered the low energy use power state.

9. A system for reduction of electricity usage in an electricity supply network of an electricity supply utility, the system including a personal computer configured to:
   a. monitor an activity level of the personal computer to determine whether the personal computer is in an active use mode;
   b. upon determining that the personal computer is not in the active use mode for a time period exceeding a threshold time period, activate a user interface on the personal computer allowing a user to provide a user indication that the personal computer should not be placed in a low energy use power state;
   c. create a data link to an external remote management center, wherein the external remote management center:

(1) is in data communication with the electricity supply utility, and
(2) includes a demand response controller adapted to:
(a) receive a demand response event notification from the electricity supply utility, the demand response event notification being a notification that the electricity supply utility is seeking a reduction of electricity usage in the electricity supply network, and
(b) provide a demand response event request, the demand response event request being a request for a reduction of electricity usage;
d. receive the demand response event request from the demand response controller;
(1) upon receipt of the demand response event request, activate the user interface only when the personal computer is determined to be outside the active use mode, the user interface allowing the user to provide the user indication indicating that the personal computer should not be placed in a low energy use power state;
(2) where such user indication is not provided by the user, command the personal computer to enter the low energy use power state.

10. The system of claim 9 further configured to command the personal computer to enter a reduced energy use power use state when such user indication that the personal computer should not be placed in a low energy use power state is provided, the reduced energy use power use state being an operational state wherein the personal computer has greater energy use than when the computer is in the low energy use power state.

11. The system of claim 9 further configured to communicate the user indication to the demand response controller, whereby the demand response controller can determine that the personal computer will not be placed in the low energy use power state.

12. The system of claim 9 further configured to:
a. receive, from an energy saving device monitoring power drawn by the personal computer, power usage data describing the power usage of the personal computer, and
b. communicate the power usage data to the remote management center.

13. The system of claim 9 further configured to receive, from an energy saving device which:
a. monitors power drawn by the personal computer, and
b. controls power supply to at least one peripheral of the personal computer, an indication that the energy saving device is installed, wherein the personal computer communicates the indication to the remote management center.

14. The system of claim 9 further including an energy saving device including:
a. an electrical inlet configured to connect to a general power outlet,
b. a monitored electrical outlet configured to connect to, and to supply electrical power to the computer,
c. a peripherals electrical outlet configured to connect to, and to supply electrical power to, a peripheral device,
d. a switch configured to control electrical connection of the electrical inlet to the peripherals electrical outlet, and thus to control supply of electric power to the peripheral device,
e. a sensor configured to sense at least one characteristic of electrical power supplied through the monitored electrical outlet to the computer,
wherein the switch is configured to remove power from the peripherals electrical outlet when the sensor detects that the computer has entered the low energy use power state.

15. The system of claim 9 further including an energy saving device including:
a. an electrical inlet configured to connect to a general power outlet,
b. a monitored electrical outlet configured to connect to, and to supply electrical power to the computer,
c. a peripherals electrical outlet configured to connect to, and to supply electrical power to, a peripheral device,
d. a switch configured to control electrical connection of the electrical inlet to the peripherals electrical outlet, and thus to control supply of electric power to the peripheral device,
e. a sensor configured to sense at least one characteristic of electrical power supplied through the monitored electrical outlet to the computer,
wherein the switch is configured to remove power from the monitored electrical outlet when the sensor detects that the computer has entered the low energy use power state.

* * * * *